United States Patent
Kim

(10) Patent No.: US 8,059,602 B2
(45) Date of Patent: *Nov. 15, 2011

(54) METHOD AND APPARATUS FOR OPTIMIZING NEIGHBOR LIST AUTOMATICALLY IN ASYNCHRONOUS WCDMA NETWORK

(75) Inventor: Shin-Jae Kim, Gyeonggi-do (KR)

(73) Assignee: KTFreetel Co., Ltd., Seoul (KR)

( * ) Notice: Subject to any disclaimer, the term of this patent is extended or adjusted under 35 U.S.C. 154(b) by 930 days.

This patent is subject to a terminal disclaimer.

(21) Appl. No.: 12/065,411

(22) PCT Filed: Aug. 28, 2006

(86) PCT No.: PCT/KR2006/003389
§ 371 (c)(1),
(2), (4) Date: Feb. 29, 2008

(87) PCT Pub. No.: WO2007/027034
PCT Pub. Date: Mar. 8, 2007

(65) Prior Publication Data
US 2008/0227455 A1   Sep. 18, 2008

(30) Foreign Application Priority Data
Aug. 29, 2005 (KR) .......... 10-2005-0079542
Dec. 14, 2005 (KR) .......... 10-2005-0123415

(51) Int. Cl.
*H04Q 7/00* (2006.01)
(52) U.S. Cl. ....... 370/331; 455/343; 455/63.4; 455/436; 455/442; 370/328; 370/329
(58) Field of Classification Search ............. 370/328, 370/331, 332, 334; 455/25, 63.4, 562.1, 455/436, 440, 443, 444
See application file for complete search history.

(56) References Cited

U.S. PATENT DOCUMENTS

| | | | | |
|---|---|---|---|---|
| 5,640,676 A | * | 6/1997 | Garncarz et al. | 455/436 |
| 5,854,981 A | * | 12/1998 | Wallstedt et al. | 455/439 |
| 6,119,005 A | | 9/2000 | Smolik | |
| 6,360,098 B1 | * | 3/2002 | Ganesh et al. | 455/436 |
| 7,065,361 B1 | * | 6/2006 | Fortuna | 455/438 |
| 7,110,766 B1 | * | 9/2006 | Tayloe et al. | 370/331 |
| 2001/0021179 A1 | | 9/2001 | Tiedemann | |
| 2003/0039228 A1 | * | 2/2003 | Shiu et al. | 370/331 |
| 2003/0176189 A1 | * | 9/2003 | Merson et al. | 455/436 |
| 2003/0190916 A1 | * | 10/2003 | Celedon et al. | 455/437 |
| 2004/0121773 A1 | * | 6/2004 | O'Brien | 455/438 |
| 2004/0166858 A1 | * | 8/2004 | Masuda et al. | 455/436 |
| 2004/0235478 A1 | * | 11/2004 | Lindquist et al. | 455/440 |
| 2005/0048974 A1 | * | 3/2005 | Kim et al. | 455/436 |
| 2005/0148368 A1 | * | 7/2005 | Scheinert et al. | 455/561 |

FOREIGN PATENT DOCUMENTS

| | | |
|---|---|---|
| KR | 10-20040048038 | 6/2004 |
| KR | 10-20050024643 | 3/2005 |

* cited by examiner

*Primary Examiner* — Ian N Moore
*Assistant Examiner* — Tam Phan
(74) *Attorney, Agent, or Firm* — Jones Day

(57) ABSTRACT

A method for automatically optimizing a neighbor list for processing handover in an asynchronous WCDMA (Wideband Code Division Multiple Access) network includes the steps of: collecting neighbor list data, call fault data, handover statistical data, base station location data and PSC information data of each base station sub-cell (or, sector) in a nationwide network; extracting all target sub-cells (or, sectors) available for handover by analyzing the collected data; endowing a weighting factor to the extracted target sub-cells (or, sectors) according to importance and then sorting calculated results so as to determine priorities; and subsequently inputting the target sub-cell (or, sector) information to the neighbor list according to the priorities.

13 Claims, 3 Drawing Sheets

[Fig. 1]
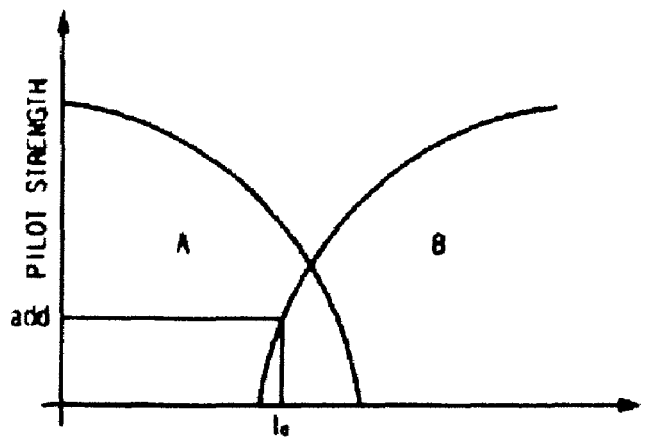
[Fig. 2]
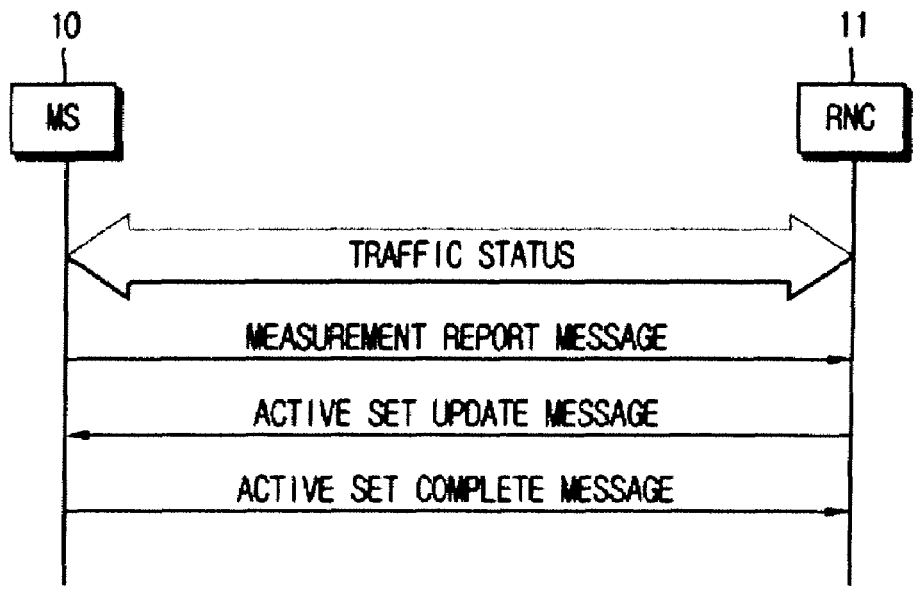
[Fig. 3]
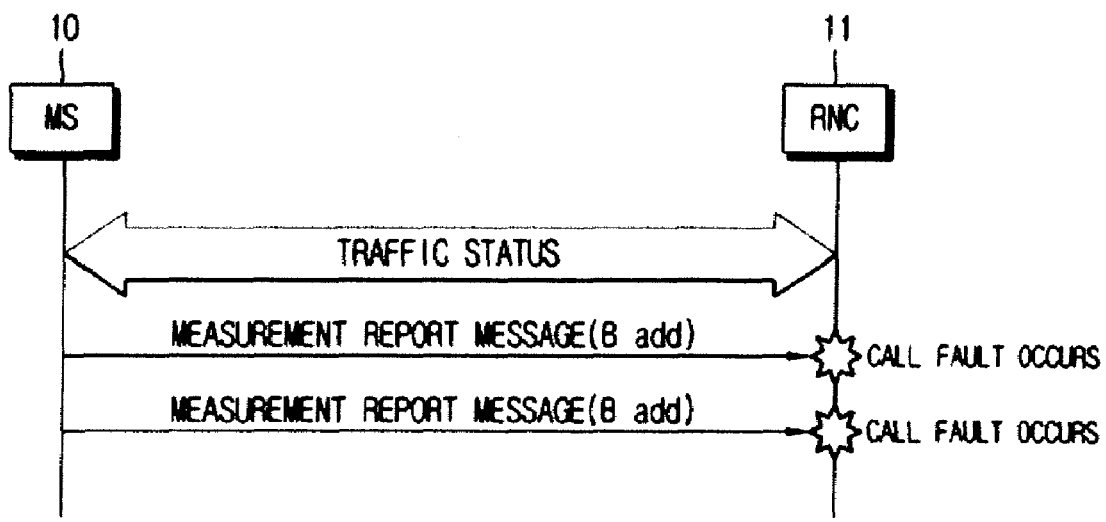

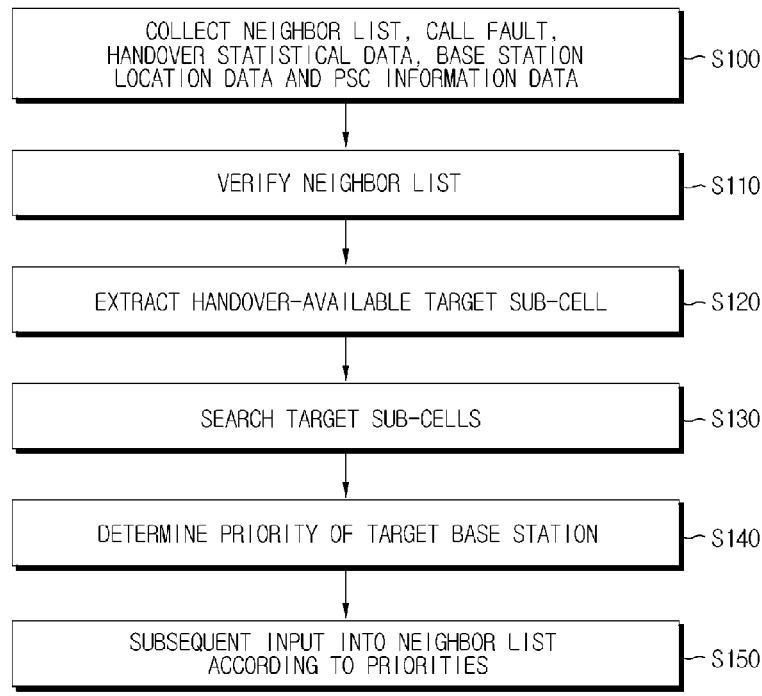
[Fig. 4]
[Fig. 5]
| EQUIPNAME | LATITUDE | LONGITUDE | RNCID | CID | TYPE | SECTORCNT | A | B | C |
|---|---|---|---|---|---|---|---|---|---|
| SL0092X | 37-33-27.966 | 126-58-32.610 | 2189 | 1 | SECTOR | 2 | 144 | 312 | - |
| SL0582X | 37-33-37.778 | 126-58-37.967 | 2189 | 2 | SECTOR | 3 | 110 | 278 | 446 |
| SL0004X | 37-33-41.738 | 126-58-58.488 | 2189 | 3 | SECTOR | 3 | 68 | 236 | 404 |
| SL0566X | 37-33-39.207 | 126-58-48.171 | 2189 | 4 | SECTOR | 2 | 50 | 218 | - |
| SL0300X | 37-33-49.077 | 126-59-05.933 | 2189 | 5 | SECTOR | 3 | 34 | 202 | 370 |
| SL1213X | 37-33-53.697 | 126-58-47.425 | 2189 | 6 | OMNI | 1 | 134 | - | - |
| SL0616X | 37-33-44.328 | 126-59-22.321 | 2189 | 7 | SECTOR | 2 | 84 | 252 | 0 |
| SL0328X | 37-33-13.793 | 126-58-20.400 | 2189 | 8 | SECTOR | 3 | 64 | 232 | 400 |
[Fig. 6]
| SOURCE INFORMATION | | | TARGET INFORMATION | STATISTIC INFORMATION | |
|---|---|---|---|---|---|
| RNC | BTS | Suvcell ID | PSC | Attempt | Fail |
| 1 | 0 | 0 | 18 | 4 | 0 |
| 1 | 0 | 0 | 26 | 449 | 0 |
| 1 | 0 | 0 | 38 | 203 | 0 |
| 1 | 0 | 0 | 46 | 6 | 0 |
| 1 | 0 | 0 | 64 | 270 | 0 |
| 1 | 0 | 0 | 108 | 119 | 0 |
| 1 | 0 | 0 | 218 | 1557 | 0 |
| 1 | 0 | 0 | 232 | 129 | 0 |
| 1 | 0 | 0 | 268 | 83 | 0 |
| 1 | 0 | 0 | 276 | 40 | 0 |
| 1 | 0 | 0 | 278 | 1541 | 1 |
| 1 | 0 | 0 | 312 | 2286 | 10 |
| 1 | 0 | 0 | 354 | 25 | 0 |
| 1 | 0 | 0 | 84 | 160 | 0 |
| 1 | 0 | 0 | 172 | 95 | 0 |
| 1 | 0 | 0 | 236 | 170 | 0 |
| 1 | 0 | 0 | 294 | 23 | 0 |
| 1 | 0 | 0 | 446 | 338 | 0 |
| 1 | 0 | 0 | 400 | 11 | 0 |
| 1 | 0 | 0 | 40 | 38 | 0 |

[Fig. 7]
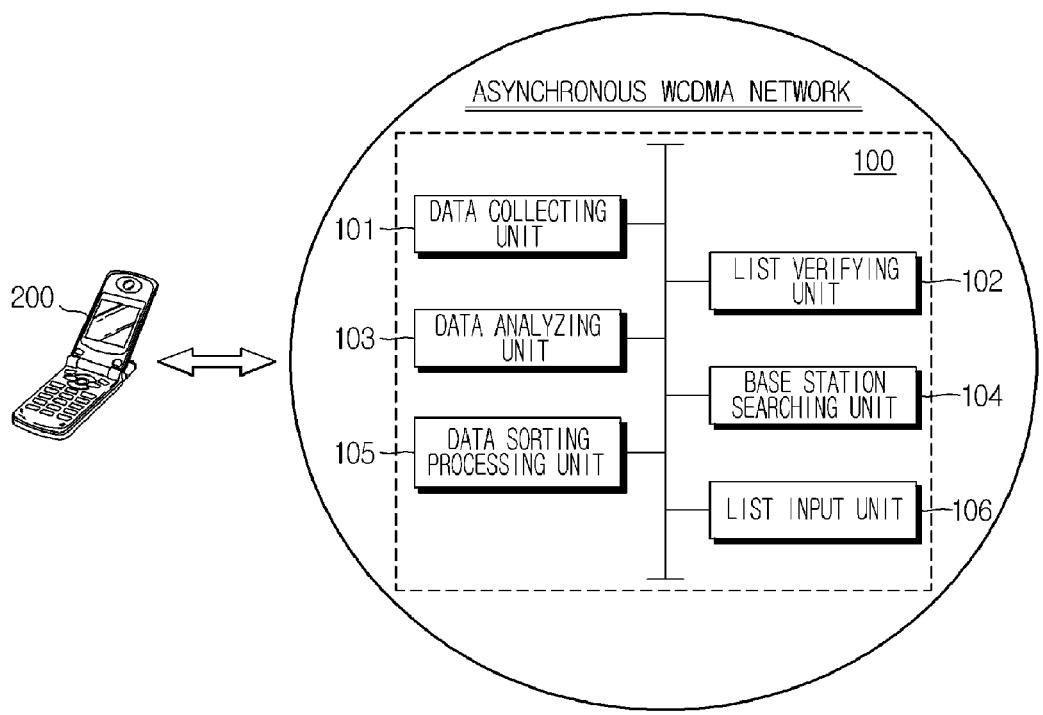
[Fig. 8]
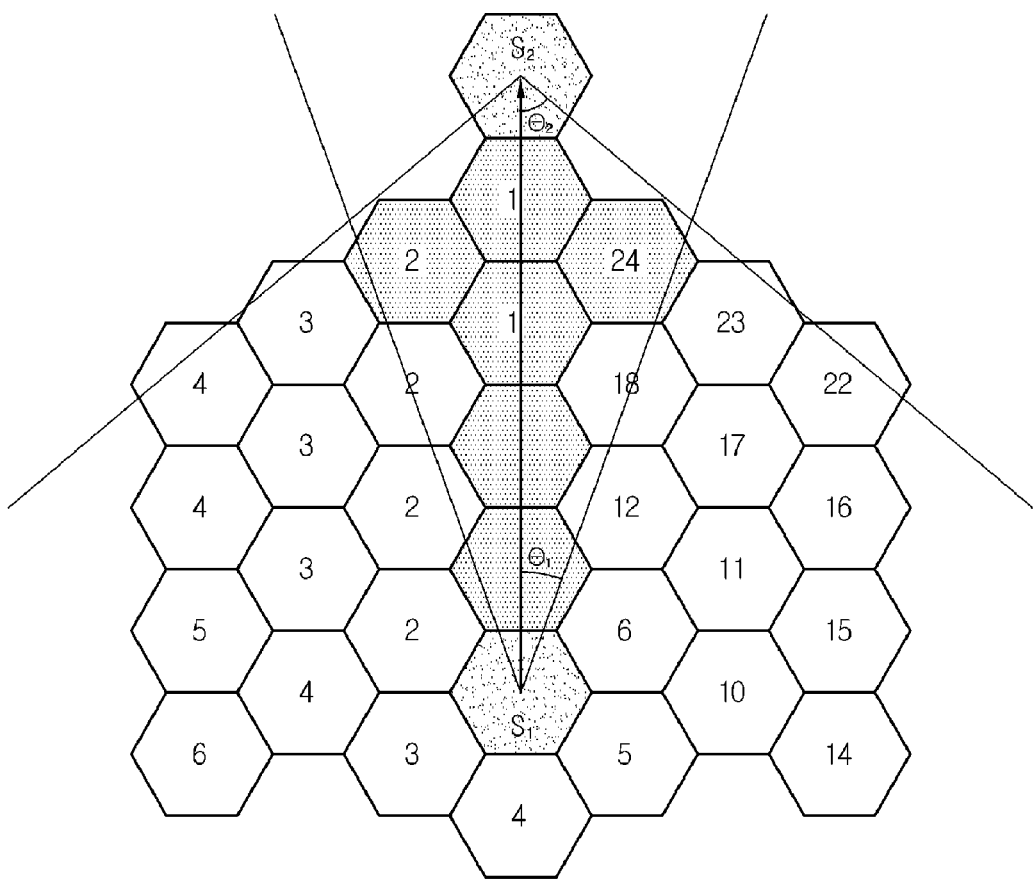

METHOD AND APPARATUS FOR OPTIMIZING NEIGHBOR LIST AUTOMATICALLY IN ASYNCHRONOUS WCDMA NETWORK

TECHNICAL FIELD

The present invention relates to method and apparatus for processing handover in an asynchronous WCDMA (Wideband Code Division Multiple Access) network, and more particularly to method and apparatus capable of automatically optimizing a neighbor list.

BACKGROUND ART

Generally, a mobile communication system provides a handover function such that a call can be continuously maintained though a mobile terminal departs from a service area (A) of a current base station and then advances into a service area (B) of an adjacent base station as shown in FIG. 1, thereby ensuring mobility.

Referring to FIG. 2, for conducting the handover function in the WCDMA network, when a pilot signal strength of a B sub-cell is detected to exceed a threshold value (add), for example, a mobile terminal (MS) 10 transmits MR (Measurement Report to a radio network controller (NEC) 11, and the RNC 11 analyzes MR and then instructs channel allocation to a corresponding base station if B sub-cell information acting as a target sub-cell exists in a neighbor list, and then transmits an active set update message to the mobile terminal 10 after the channel allocation is conducted. After that, the mobile terminal 10 transmits an active set update completion message to the RNC 11, thereby completing the handover processing.

In an asynchronous WCDMA network, pilots are managed in groups classified into an active set, a monitored set, and a detected set. Here, the active set is a group of PSC (Primary Scrambling Code) that are pilot offsets associated with a traffic channel currently connected to the mobile terminal. The monitored set is a group of pilot offsets existing in a cell info list but not belonging to the active set. The detected set is a group of pilots not belonging to the active set and the monitored set.

For the mobile terminal to successfully conduct handover, information of a target sub-cell should be exist in a neighbor list corresponding to a source sub-cell. Thus, it is very important to correctly make and update the neighbor list.

FIG. 3 shows a handover failure at points t and t at which handover is conducted incase the information of a target sub-cell does not exist in the neighbor list. As shown in FIG. 3, when a pilot signal strength of the B sub-cell is detected to exceed a threshold value (add), the mobile terminal 10 transmits MR to the RNC 11, and the RNC 11 analyzes MR and then generates a call fault informing the handover failure if it is checked that a target sub-cell does not exist in the neighbor list.

The neighbor list is generally made and updated based on manual operation of an operator, which thus takes much data analyzing time, gives possibility of subjective recording or errors, and also takes much time to verify a prepared neighbor list. Thus, there is a need for a scheme capable of automatically optimizing a neighbor list.

As a related technique, Korean Laid-open Patent Publication No. 2004-48038, entitled "Method for automatically updating a neighbor list in a CMDA communication network", discloses increasing a handoff success rate by adding a handoff (handover) failed PN to a neighbor list using a neighbor PN (Pseudo Noise) statistical list, or by adjusting a neighbor list extract priority upward according to a handover trial frequency for the handoff-failed PN. However, this technique executes the neighbor list updating process per each base station controller (BSC), so it cannot receive statistical information on a PN not related to the corresponding BSC and thus it cannot update the information.

Korean Laid-open Patent Publication No. 2005-24643, entitled "Method and apparatus for generating a handover neighbor list in a cellular mobile communication system", discloses determining priorities of subject base stations according to an order of handover occurrence frequencies and then generating a neighbor list according to the order. However, this technique has a limit in analyzing works since it uses handover statistical information per each base station, so it is difficult to give a highly reliable list. In addition, since it is difficult to get accurate location information of a base station not existing in a neighbor list but substantially included in statistics, it hardly calculates an accurate neighbor list, and also it cannot analyze a call fault generated when there is a handover request for a sub-cell in a remaining set.

DISCLOSURE OF INVENTION

Technical Problem

The present invention is designed in consideration of the above problems, and therefore it is an object of the invention to provide method and apparatus for automatically optimizing a neighbor list in an asynchronous WCDMA network, which is capable of making a neighbor list with high reliability in a way of organically analyzing neighbor list data, call fault data, handover statistical data, base station location data and PSC information data and so on of each base station sub-cell (or, sector) in the nationwide network and then determining priorities of target sub-cells (or, sectors) to be input.

Another object of the present invention is to provide method and apparatus for automatically optimizing a neighbor list in an asynchronous WCDMA network, which is capable of making a neighbor list with high reliability in a way of determining a priority of a target sub-cell (or, sector) by utilizing the number of base stations between a source base station and a target base station, which give an influence on handover.

Still another object of the present invention is to provide method and apparatus for automatically optimizing a neighbor list in an asynchronous WCDMA network, which is capable of automatically verifying a neighbor list.

Technical Solution

In order to accomplish the above object, the present invention provides a method for automatically optimizing a neighbor list for processing handover in an asynchronous WCDMA (Wideband Code Division Multiple Access) network, which includes the steps of: (a) collecting neighbor list data, call fault data, handover statistical data, base station location data and PSC (Primary Scrambling Code) information data of each base station sub-cell (or, sector) in a nationwide network; (b) extracting all target sub-cells (or, sectors) available for handover by analyzing the collected data; (c) endowing a weighting factor to the extracted target sub-cells (or, sectors) according to importance and then sorting calculated results so as to determine priorities; and (d) subsequently inputting the target sub-cell (or, sector) information to the neighbor list according to the priorities.

Preferably, the step (c) includes the steps of: calculating the number of intermediate base stations positioned within a distance between a source base station and a target base station and existing within a threshold angle toward the target base station based on the source base station and a threshold angle toward the source base station based on the target base station, as for the extracted target sub-cells (or, sectors); and determining priorities of the target sub-cells (or, sectors) by sorting such that a target base station with a relatively lower index, calculated including the number of intermediate base stations and the distance, has a higher priority.

Preferably, the step (b) further includes the step of: verifying contents of the neighbor list by comparing the neighbor list data with the base station location data and the PSC information data.

Preferably, the base station location data and the PSC information data are compared with radio network controller ID (RNC ID), Cell ID, Cell Number and PSC data in the neighbor list for the verification.

Preferably, in the step (c), the target sub-cell (or, sector) information is classified into a type that a target sub-cell (or, sector) exists in the neighbor list and exists in the handover statistics, a type that a target sub-cell (or, sector) does not exist in the neighbor list but exists in the handover statistics, a type that a target sub-cell (or, sector) exists in the neighbor list but does not exist in the handover statistics, a type that a target sub-cell (or, sector) does not exist in the neighbor list and a handover failure PSC occurs, and a type that a target sub-cell (or, sector) exists in the neighbor list but handover is failed, and then a weighting factor is endowed thereto depending on importance of each type.

Preferably, in the step (c), RNC ID, Cell ID, Cell Number and PSC information of each classified target sub-cell (or, sector) is utilized to check location of the target sub-cell (or, sector).

Preferably, a weighting factor is endowed to a handover trial frequency for the target sub-cell (or, sector) of each type.

Preferably, the handover trial frequency information is obtained as a trial frequency of the handover statistics, or by extracting detected sets included in the call fault data and then counting the detected sets.

In another aspect of the present invention, there is also provided an apparatus for automatically optimizing a neighbor list for processing handover in an asynchronous WCDMA network, which includes: a data collecting unit for collecting neighbor list data, call fault data, handover statistical data, base station location data and PSC information data of each base station sub-cell (or, sector) in a nationwide network; a data analyzing unit for analyzing the collected data to extract all target sub-cells (or, sectors) available for handover; a data sorting processing unit for endowing a weighing factor to the extracted target sub-cell (or, sector) information depending on importance and then sorting the calculated results in order so as to determine priorities thereof; and a list input unit for subsequently inputting the target sub-cell (or, sector) information to the neighbor list according to the priorities.

Preferably, the apparatus for automatically optimizing a neighbor list may further include a base station searching unit for calculating the number of intermediate base stations, which are positioned within a distance between a source base station and a target base station and exist within a threshold angle toward the target base station based on the source base station and within a threshold angle toward the source base station based on the target base station, for the extracted target sub-cells (or, sectors), wherein the data sorting processing unit determines priorities of the target sub-cells (or, sectors) by sorting such that a target base station with a relatively lower index, calculated including the number of intermediate base stations and the distance, has a higher priority.

Preferably, the apparatus for automatically optimizing a neighbor list may further include a list verifying unit for verifying contents of the neighbor list by comparing the neighbor list data with the base station location data and the PSC information data.

Preferably, the list verifying unit verifies the contents by comparing RNC ID, Cell ID, Cell Number and PSC data in the neighbor list with the base station location data and the PSC information data.

Preferably, the data sorting processing unit classifies the target sub-cell (or, sector) information into a type that a target sub-cell (or, sector) exists in the neighbor list and exists in the handover statistics, a type that a target sub-cell (or, sector) does not exist in the neighbor list but exists in the handover statistics, a type that a target sub-cell (or, sector) exists in the neighbor list but does not exist in the handover statistics, a type that a target sub-cell (or, sector) does not exist in the neighbor list and a handover failure PSC occurs, and a type that a target sub-cell (or, sector) exists in the neighbor list but handover is failed, and then endows a weighting factor depending on importance of each type.

Preferably, the data sorting processing unit endows a weighting factor to a handover trial frequency of the target sub-cell (or, sector) of each type.

Preferably, the handover trial frequency information is obtained as a trial frequency of the handover statistics of each sector, or by extracting detected sets included in the call fault data and then counting the detected sets.

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 is a graph showing a MR transmission point for processing handover in an asynchronous WCDMA network;

FIG. 2 is a flowchart illustrating a handover processing procedure in case information on a target sub-cell (or, sector) exists in a neighbor list;

FIG. 3 is a flowchart illustrating a processing procedure in case information on a target sub-cell (or, sector) does not exist in a neighbor list;

FIG. 4 is a flowchart illustrating a method for automatically optimizing a neighbor list according to a preferred embodiment of the present invention;

FIG. 5 is a table showing an example of base station location information and PSC information data;

FIG. 6 is a table showing an example of handover statistical data;

FIG. 7 is a block diagram showing an apparatus for automatically optimizing a neighbor list according to a preferred embodiment of the present invention; and FIG. 8 shows an example of calculating the number of intermediate base stations by a base station searching unit of FIG. 7.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

FIG. 4 shows a process of executing a method for automatically optimizing a neighbor list according to a preferred embodiment of the present invention.

Referring to FIG. 4, a process of collecting neighbor list data, call fault data, handover statistical data, base station location data and PSC information data corresponding to all sectors composing an asynchronous WCDMA network is executed (step S100).

In the neighbor list prepared for each sub-cell according to the standards of an asynchronous WCDMA network, information of a source sub-cell and information such as radio network controller ID (RNC ID), Cell ID, Cell Number, mobile country code, mobile network code, location area code, location area code, routing area code, PSC number and so on of a target sub-cell are input.

The call fault is a message generated in the BSC when a mobile terminal requests handover for PSC in the detected set. This message includes active set information and detected set information.

The base station location information is expressed using latitude and longitude as shown in FIG. 5. The PSC information of a base station corresponds to PSC information allocated to each sub-cell that is subdivided in a base station as well known in the art. In FIG. 5, the fields A, B and G respectively show PSC information of a sub-cell, b sub-cell and c sub-cell.

The handover statistics provides information of a source sub-cell and a target sub-cell, and information such as handover trial frequency and handover failure frequency, as shown in FIG. 6. The table of FIG. 6 shows an example of handover trial frequency and handover failure frequency to a target sub-cell from a source sub-cell corresponding to the first RNC, $0^{th}$ base station (BTS), a sub-cell (Sub-cell ID=0). Here, the period of the statistical data may be set variously, for example 15 minutes, 1 hour or 1 day.

Such data collecting process is preferably conducted for each sub-cell for the purpose of exact analysis, but it may be conducted for each sector if the load of network is allowed. Hereinafter, the following explanation will be based on an example that data is processed for each sub-cell in a nationwide network.

After collecting data as mentioned above, a process of detecting an error by means of verification of contents by comparing an already prepared neighbor list for the source sub-cell of the mobile terminal requesting handover with the base station location data and the PSC information data is preferably executed (step S110). In the verification, information such as RNC ID, Cell ID, Cell Number, PSC and so on of a target sub-cell is compared.

After the verification of the neighbor list is completely verified, a process of analyzing the neighbor list, the call fault, the handover statistical data, the base station location information and the PSC information data, which are collected in S100, and then extracting all target sub-cells available for handover at any source sub-cell is executed (step S120). That is to say, the neighbor list data is analyzed to extract handover-available target sub-cells decided by an operator, the call fault data is analyzed to extract target sub-cells occurring any actual problem, and the handover statistical data is analyzed to extract handover-available target sub-cells in the statistics.

Then, the extracted target sub-cells are searched to determine a priority of a target base station to be input to the neighbor list (steps S130 and S140).

For searching each target sub-cell, preferably, the number of intermediate base stations giving an influence while moving from a source base station to a corresponding target base station is calculated. That is to say, the number of intermediate base stations located within an absolute distance between the source base station and the target base station, calculated by the collected base station latitude and longitude information, and positioned within a forward threshold angle toward the target base station based on the source base station and a backward threshold angle toward the source base station based on the target base station is calculated.

The forward threshold angle is defined as an angle that is an absolute value obtained by deducting an angle between the source base station and the intermediate base station from an angle between the source base station and the target base station. In addition, the backward threshold angle is defined as an angle that is an absolute value obtained by deducting an angle between the target base station and the intermediate base station from an angle between the target base station and the source base station. Here, as well known in the art, the angle between base stations may be easily calculated using a trigonometrical function of a right-angled triangle that takes three sides with a distance in a straight line between the corresponding base stations, a horizontal distance corresponding to a difference of latitudes of the base stations, and a vertical distance corresponding to a difference of longitudes of the base stations.

After the number of intermediate base stations within the forward and backward threshold angles of the source base station and the target base station is calculated, an index of each target sub-cell is calculated using the number of intermediate base stations and the distance between the source base station and the target base station. Then, priorities of the target sub-cells are determined by sorting the target sub-cells in order so that a target base station with a relatively lower index has a higher priority. This index may be calculated using an operation that multiplies the number of intermediate base stations by a value obtained by endowing a predetermined weighting factor to the absolute distance between the source base station and the target base station, but not limitedly. Here, the weighting factor is an experience value arbitrarily determined by an operator for facilitating easier sorting.

In the index calculating process, it is preferred to classify the target sub-cells extracted in S120 depending on their types and then further include a resultant value obtained by endowing a predetermined weighting value depending on its importance. In this case, an index is calculated for each target sub-cell in a way of endowing pre-determined weighting factors to the number of intermediate base stations, the distance between the source base station and the target base station, and the importance according to the type of the corresponding target sub-cell and then executing a pre-determined operation thereto.

Here, the types of target sub-cells are preferably classified into a type that a target sub-cell exists in the already prepared neighbor list and also in the handover statistics, a type that a target sub-cell does not exist in the neighbor list but exists in the handover statistics, a type that a target sub-cell exists in the neighbor list but does not exist in the handover statistics, a type that a target sub-cell does not exist in the neighbor list and an handover failure PSC occurs, and a type that a target sub-cell exists in the neighbor list but handover is failed.

Location information for target sub-cells classified depending on their types are verified by utilizing RNC ID, Cell ID, Cell Number and PSC corresponding to each target sub-cell.

After target sub-cells are classified, a weighting factor is endowed thereto depending on importance of each type, and then the calculated results are sorted in order so as to determine priorities. At this time, the weighting factor is an experience value arbitrarily decided by an operator for facilitating easier sorting, and it is preferably endowed for a handover trial frequency of each target sub-cell. The handover trial frequency information may be obtained as a trial frequency of the handover statistics of each sector, or by extracting detected sets included in the call fault data and then counting them.

If the information of target sub-cells (or, sectors) is subsequently input to the neighbor list according to the priorities determined in the above method, a process for automatically optimizing the neighbor list is completed (step S150). The neighbor list optimized as mentioned above is automatically or manually input to an O&M (Operation and Maintenance) server that is a wireless management system, and then applied to a CDMA nationwide network.

FIG. 7 shows an apparatus for automatically optimizing a neighbor list according to a preferred embodiment of the present invention.

Referring to FIG. 7, the automatic neighbor list optimizing apparatus 100 of this embodiment includes a data collecting unit 101 for collecting handover-related data, a data analyzing unit 103 for analyzing the data and extracting handover-available target sub-cells, a data sorting processing unit 105 for determining priorities of target sub-cells, and a list input unit 106 for inputting target sub-cell information to the neighbor list according to the determined priorities.

The data collecting unit 101 collects neighbor list data corresponding to all sub-cells composing an asynchronous WCDMA network, call fault data including handover-failed PSC information, base station location information data expressed using latitude and longitude, PSC information data of each sub-cell subdivided in a base station, and handover statistical data giving information related to a source sub-cell and a target sub-cell and also information such as handover trial frequency and failure frequency.

The data analyzing unit 103 extracts all target sub-cells available for handover by analyzing the neighbor list data, the call fault data, the handover statistical data, the base station location data and the PSC information data. That is to say, the data analyzing unit 103 extracts handover-available target sub-cells decided by an operator by analyzing the neighbor list data, extracts target sub-cells having caused any actual problem by analyzing the call fault data, and extracts handover-available target sub-cells in statistics by analyzing the handover statistical data.

The automatic neighbor list optimizing apparatus 100 preferably further includes a list verifying unit 102 for verifying contents of the neighbor list so as to detect an error of the neighbor list. The list verifying unit 102 verifies contents and detects an error by comparing the base station location data and the PSC information data with the neighbor list already prepared for a source sub-cell of a mobile terminal 200 that requests handover. Here, the information to be compared in the verifying process includes RNC ID, Cell ID, Cell Number, PSC information and so on of a target sub-cell.

The automatic neighbor list optimizing apparatus 100 is preferably further provided with a base station searching unit 104 so as to search target sub-cells extracted by the data analyzing unit 103 and then calculate the number of intermediate base stations corresponding to each target base station. Here, the method for calculating the number of intermediate base stations existing between a source base station and a target base station is identical to the above case. That is to say, the number of intermediate base stations positioned within an absolute distance between a source base station and a target base station and also existing within a forward threshold angle toward the target base station based on the source station and a backward threshold angle toward the source base station based on the target station is calculated. For example, as shown in FIG. 8, in case a forward threshold angle $q_1$ is 20 in a view point of the source base station $S_1$ and a backward threshold angle $q_2$ is 40 in a view point of the target base station $S_2$, the number of base stations giving an influence between the source base station $S_1$ and the target station $S_2$ is calculated as 6.

The data sorting processing unit 105 determines priorities of target sub-cells by sorting such that that a target base station with a lower index, calculated using the number of intermediate base stations corresponding to each target base station and the distance between the source base station and the target base station, has a higher priority. For this purpose, the data sorting processing unit 105 conducts an operation for each target base station, namely multiplying the number of intermediate base stations by a value obtained by endowing a predetermined weighting factor to the absolute distance between the source base station and the target base station, and then sorts the target base stations so that a relatively lower value among the operation resultant values has a higher priority.

More preferably, the data sorting processing unit 105 classifies the target sub-cells extracted in the data analyzing unit 103 depending on their types, and then calculates the index by additionally including a resultant value obtained by endowing a pre-determined weighting factor according to their importance. In this case, the index is calculated for each target sub-cell in a way of endowing a predetermined weighting factor to the number of intermediate base stations, the distance between the source base station and the target base station, and the importance according to a type of the corresponding target sub-cell, and then executing a predetermined operation thereto. The types of target sub-cells are preferably classified into a type that a target sub-cell exists in the already prepared neighbor list and also in the handover statistics, a type that a target sub-cell does not exist in the neighbor list but exists in the handover statistics, a type that a target sub-cell exists in the neighbor list but does not exist in the handover statistics, a type that a target sub-cell does not exist in the neighbor list and an handover failure PSC occurs, and a type that a target sub-cell exists in the neighbor list but handover is failed.

As an alternative, the data sorting processing unit 105 may also calculate the index using only a value obtained by endowing a predetermined weighting factor to the importance according to the type of the corresponding target sub-cell.

The list input unit 106 optimizes the neighbor list by subsequently inputting the target sub-cell information according to the priorities determined by the data sorting processing unit 105. The neighbor list optimized as mentioned above is input to an O&M (Operation and Maintenance) server that is a wireless management system, and then applied to a nationwide network.

The automatic neighbor list optimizing apparatus configured as mentioned above according to a preferred embodiment of the present invention initially operates the data collecting unit 101 to collect the neighbor list data, the call fault data, the handover statistical data, and the base station location data and the PSC information data, and then operates the list verifying unit 102 to verify contents of the neighbor list and thus detect an error.

After the neighbor list is completely verified, the data analyzing unit 103 analyzes the collected data to extract all target sub-cells available for handover.

In addition, the base station searching unit 104 calculates the number of intermediate base stations positioned within a threshold angle within a distance range between the source base station and the target base station, and the data sorting processing unit 105 sorts the target base stations from one having a relatively lower index calculated for each target sub-cell in a way of endowing a predetermined weighting factor to the number of intermediate base stations, the distance between the source base station and the target base station, and the importance according to a type of the corresponding target sub-cell (or, sector), and then conducting a predetermined operation thereto, thereby determining priorities of the target sub-cell.

When the priorities of the target sub-cells are determined, the list input unit 106 automatically inputs the target sub-cell information to the neighbor list according to the priorities, thereby optimizing the list.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, after neighbor list data, call fault data, base station location and PSC information data, handover statistical data of each sub-cell and so on of each base station sub-cell of the nationwide network are analyzed, the neighbor list is automatically input utilizing all handover-available target sub-cell information, so it is possible to optimize the neighbor list within a short time though a service area is changed due to establishment of a new base station/relay or moving of an existing base station/relay.

In particular, since an input priority of the neighbor list is obtained by calculating the number of intermediate base stations giving an influence while moving from a source base station to a target base station, it is possible to improve reliability of the neighbor list.

The invention claimed is:

1. A method for automatically optimizing a neighbor list for processing handover in a synchronous WCDMA (Wideband Code Division Multiple Access) network, comprising:
   (a) collecting, by a data collecting unit, neighbor list data, call fault data, handover statistical data, base station location data and PSC (Primary Scrambling Code) information data of each base station sub-cell (or, sector) in a nationwide network;
   (b) extracting, by a data analyzing unit, all target sub-cells (or, sectors) available for handover by analyzing the collected data;
   (c) calculating, by a base station searching unit, the number of intermediate base stations positioned within a distance between a source base station and a target base station and existing within a threshold angle toward the target base station based on the source base station and a threshold angle toward the source base station based on the target base station, as for the extracted target sub-cells (or, sectors); and
   (d) determining, by a data sorting processing unit, priorities of the target sub-cells (or, sectors) by sorting such that a target base station with a relatively lower index, calculated including the number of intermediate base stations and the distance, has a higher priority;
   (e) wherein the index is calculated using an operation that multiplies the number of intermediate base stations by a value obtained by endowing a predetermined weighting factor to the absolute distance between the source base station and the target base station;
   (f) subsequently inputting, by a list input unit, the target sub-cell (or, sector) information to the neighbor list according to the priorities.

2. The method for automatically optimizing a neighbor list according to claim 1, in the step (b), further comprising:
   verifying contents of the neighbor list by comparing the neighbor list data with the base station location data and the PSC information data.

3. The method for automatically optimizing a neighbor list according to claim 2, wherein the base station location data and the PSC information data are compared with network controller ID (RNC ID), Cell ID, Cell Number and PSC data in the neighbor list for the verification.

4. The method for automatically optimizing a neighbor list according to claim 1,
   wherein, in the step (c), the target sub-cell (or, sector) information is classified into a type that a target sub-cell (or, sector) exists in the neighbor list and exists in the handover statistics, a type that a target sub-cell (or, sector) does not exist in the neighbor list but exists in the handover statistics, a type that a target sub-cell (or, sector) exists in the neighbor list but does not exist in the handover statistics, a type that a target sub-cell (or, sector) does not exist in the neighbor list and a handover is failed, or a type that a target sub-cell (or, sector) exists in the neighbor list but a handover is failed, and then the weighting factor is endowed thereto depending on importance of each type.

5. The method for automatically optimizing a neighbor list according to claim 4, wherein RNC ID, Cell ID, Cell Number and PSC information of each classified target sub-cell (or, sector) is utilized to check location of the target sub-cell (or, sector).

6. The method for automatically optimizing a neighbor list according to claim 4, wherein the weighting factor is endowed to a handover trial frequency for the target sub-cell (or, sector) of each type.

7. The method for automatically optimizing a neighbor list according to claim 6, wherein the handover trial frequency information is obtained as a trial frequency of the handover statistics, or as a number of detected sets extracted from the call fault data.

8. An apparatus for automatically optimizing a neighbor list for processing handover in a synchronous WCDMA network, comprising:
   a data collecting unit for collecting neighbor list data, call fault data, handover statistical data, base station location data and PSC (Primary Scrambling Code) information data of each base station sub-cell (or, sector) in a nationwide network;

a data analyzing unit for analyzing the collected data to extract all target sub-cells (or, sectors) available for handover;

a base station searching unit for calculating the number of intermediate base stations, which are positioned within a distance between a source base station and a target base station and exist within a threshold angle toward the target base station based on the source base station and within a threshold angle toward the source base station based on the target base station, for the extracted target sub-cells (or, sectors);

a data sorting processing unit for endowing a weighting factor to the extracted target sub-cell (or, sector) information depending on importance and then sorting the calculated results in order so as to determine priorities thereof;

wherein the data sorting processing unit determines priorities of the target sub-cells (or, sectors) by sorting such that a target base station with a relatively lower index, calculated including the number of intermediate base stations and the distance, has a higher priority;

wherein the index is calculated using an operation that multiplies the number of intermediate base stations by a value obtained by endowing the weighting factor to the absolute distance between the source base station and the target base station; and a list input unit for subsequently inputting the target sub-cell (or, sector) information to the neighbor list according to the priorities.

9. The apparatus for automatically optimizing a neighbor list according to claim 8, further comprising:

a list verifying unit for verifying contents of the neighbor list by comparing the neighbor list data with the base station location data and the PSC information data.

10. The apparatus for automatically optimizing a neighbor list according to claim 9, wherein the list verifying unit verifies the contents by comparing RNC ID, Cell ID, Cell Number and PSC data in the neighbor list with the base station location data and the PSC information data.

11. The apparatus for automatically optimizing a neighbor list according to claim 8, wherein the data sorting processing unit classifies the target sub-cell (or, sector) information into a type that a target sub-cell (or, sector) exists in the neighbor list and exists in the handover statistics, a type that a target sub-cell (or, sector) does not exist in the neighbor list but exists in the handover statistics, a type that a target sub-cell (or, sector) exists in the neighbor list but does not exist in the handover statistics, a type that a target sub-cell (or, sector) does not exist in the neighbor list and a handover is failed or a type that a target sub-cell (or, sector) exists in the neighbor list but a handover is failed, and then endows the weighting factor depending on importance of each type.

12. The apparatus for automatically optimizing a neighbor list according to claim 11, wherein the data sorting processing unit endows the weighting factor to a handover trial frequency of the target sub-cell (or, sector) of each type.

13. The apparatus for automatically optimizing a neighbor list according to claim 12, wherein the handover trial frequency information is obtained as a trial frequency of the handover statistics of each sector, or as a number of detected sets extracted from the call fault data.

\* \* \* \* \*